(12) United States Patent
Haverinen et al.

(10) Patent No.: US 12,744,672 B2
(45) Date of Patent: Sep. 22, 2026

(54) USER AUTHENTICATION IN AN INDUSTRIAL SYSTEM

(71) Applicant: SANDVIK MINING AND CONSTRUCTION OY, Tampere (FI)

(72) Inventors: Henry Haverinen, Tampere (FI); Eero Paajanen, Tampere (FI); Jere Paavola, Tampere (FI); Jarkko Holappa, Tampere (FI); Johannes Koskinen, Tampere (FI)

(73) Assignee: Sandvik Mining and Construction Oy, Tampere (FI)

( * ) Notice: Subject to any disclaimer, the term of this patent is extended or adjusted under 35 U.S.C. 154(b) by 6 days.

(21) Appl. No.: 18/712,918

(22) PCT Filed: Nov. 25, 2022

(86) PCT No.: PCT/EP2022/083367
§ 371 (c)(1),
(2) Date: May 23, 2024

(87) PCT Pub. No.: WO2023/094636
PCT Pub. Date: Jun. 1, 2023

(65) Prior Publication Data

US 2025/0023734 A1 Jan. 16, 2025

(30) Foreign Application Priority Data

Nov. 25, 2021 (EP) .................................... 21210461

(51) Int. Cl.

| | |
|---|---|
| ***H04L 9/32*** | (2006.01) |
| ***H04L 9/08*** | (2006.01) |
| ***H04L 9/14*** | (2006.01) |

(52) U.S. Cl.
CPC .......... *H04L 9/3226* (2013.01); *H04L 9/0866* (2013.01); *H04L 9/14* (2013.01); *H04L 9/3271* (2013.01)

(58) Field of Classification Search
CPC ....... H04L 9/3226; H04L 9/0866; H04L 9/14; H04L 9/3271; H04L 63/08; H04L 63/18; H04L 63/068; H04L 2463/061; H04L 63/062
See application file for complete search history.

(56) References Cited

U.S. PATENT DOCUMENTS

| | | | | |
|---|---|---|---|---|
| 11,805,128 B2 * | 10/2023 | Schuberth | ............. | H04L 63/083 |
| 2003/0070069 A1 * | 4/2003 | Belapurkar | ........... | H04L 9/3226 726/8 |
| 2015/0154136 A1 | 6/2015 | Markovic et al. | | |

(Continued)

*Primary Examiner* — Henry Tsang
(74) *Attorney, Agent, or Firm* — Corinne R. Gorski

(57) ABSTRACT

Devices, methods and computer programs for user authentication in an industrial system are disclosed. A first apparatus associated with an industrial system receives a user identifier uniquely associated with a user. The first apparatus derives a second symmetric cryptographic key specific at least to the user based at least on the received user identifier and a first symmetric cryptographic key specific to the industrial system and stored in a first storage in the first apparatus. The first apparatus attempts to authenticate the user based at least on the derived second symmetric cryptographic key. In response to successfully authenticating the user, the first apparatus grants the user access to the industrial system.

14 Claims, 5 Drawing Sheets

(56) References Cited

U.S. PATENT DOCUMENTS

| | | | | |
|---|---|---|---|---|
| 2016/0043866 | A1* | 2/2016 | Nixon | G05B 19/418 713/168 |
| 2016/0234683 | A1 | 8/2016 | Bone et al. | |
| 2019/0386981 | A1* | 12/2019 | Ramesh Kumar | H04L 9/3228 |
| 2020/0209818 | A1 | 7/2020 | Suessmilch et al. | |
| 2022/0141212 | A1* | 5/2022 | Kumar | H04L 63/0807 726/4 |

* cited by examiner

USER AUTHENTICATION IN AN INDUSTRIAL SYSTEM

RELATED APPLICATION DATA

This application is a § 371 National Stage Application of PCT International Application No. PCT/EP2022/080930 filed Nov. 7, 2022 with priority to EP 21209967.5 filed Nov. 23, 2021.

TECHNICAL FIELD

The disclosure relates generally to cryptography and, more particularly but not exclusively, to user authentication in an industrial system.

BACKGROUND

In an industrial context, a product supplier or system integrator provides, for example, a machine or an operational technology (OT) solution to an asset owner. After the delivery, the supplier may continue to maintain the delivered machine or solution. For this purpose, the service personnel of the supplier may have to authenticate to the machine or solution, and the machine or solution needs to check that the service person (for example, user) being authenticated is authorized to perform the maintenance operations.

Traditionally, user authentication may be handled with, for example, shared accounts, where multiple service persons will use the same service account.

However, new industry standards such as IEC 62443 require unique authentication of each human user and authorization checks based on the principle of least privilege. There are also requirements for keeping an audit trail of user actions. Traditional shared accounts fail to meet these requirements.

SUMMARY

The scope of protection sought for various example embodiments of the disclosure is set out by the independent claims. The example embodiments and features, if any, described in this specification that do not fall under the scope of the independent claims are to be interpreted as examples useful for understanding various example embodiments of the disclosure.

An example embodiment of a first apparatus associated with an industrial system comprises at least one processor, at least one memory including computer program code, and a first storage configured to store a first symmetric cryptographic key specific to the industrial system. The at least one memory and the computer program code are configured to, with the at least one processor, cause the first apparatus at least to: receive a user identifier uniquely associated with a user; derive a second symmetric cryptographic key specific at least to the user based at least on the received user identifier and the stored first symmetric cryptographic key; attempt to authenticate the user based at least on the derived second symmetric cryptographic key; and in response to successfully authenticating the user, grant the user access to the industrial system.

An example embodiment of a first apparatus associated with an industrial system comprises means for performing: causing the first apparatus to receive a user identifier uniquely associated with a user; deriving a second symmetric cryptographic key specific at least to the user based at least on the received user identifier and a first symmetric cryptographic key specific to the industrial system and stored in a first storage in the first apparatus; attempting to authenticate the user based at least on the derived second symmetric cryptographic key; and in response to successfully authenticating the user, granting the user access to the industrial system.

An example embodiment of a method comprises: receiving, at a first apparatus associated with an industrial system, a user identifier uniquely associated with a user; deriving, by the first apparatus, a second symmetric cryptographic key specific at least to the user based at least on the received user identifier and a first symmetric cryptographic key specific to the industrial system and stored in a first storage in the first apparatus; attempting, by the first apparatus, to authenticate the user based at least on the derived second symmetric cryptographic key; and in response to successfully authenticating the user, granting, by the first apparatus, the user access to the industrial system.

An example embodiment of a computer program comprises instructions for causing a first apparatus associated with an industrial system to perform at least the following: receiving a user identifier uniquely associated with a user; deriving a second symmetric cryptographic key specific at least to the user based at least on the received user identifier and a first symmetric cryptographic key specific to the industrial system and stored in a first storage in the first apparatus; attempting to authenticate the user based at least on the derived second symmetric cryptographic key; and in response to successfully authenticating the user, granting the user access to the industrial system.

In an example embodiment, alternatively or in addition to the above-described example embodiments, the authentication of the user based at least on the derived second symmetric cryptographic key comprises at least one of: authentication based on using the derived second symmetric cryptographic key as a password in a password-based authentication protocol, authentication based on using the derived second symmetric cryptographic key as a basis for determining a password for a password-based authentication protocol, authentication based on using the derived second symmetric cryptographic key in transport level security, TLS, authentication, or authentication based on using the derived second symmetric cryptographic key in determining a token or an authentication header for a HTTPS REST API call.

In an example embodiment, alternatively or in addition to the above-described example embodiments, the authentication of the user based at least on the derived second symmetric cryptographic key comprises authentication based on using the derived second symmetric cryptographic key in challenge-response authentication.

In an example embodiment, alternatively or in addition to the above-described example embodiments, the using of the derived second symmetric cryptographic key in the challenge-response authentication comprises: displaying at least a first character string as a challenge; receiving at least a second character string as response to the challenge; determining a third character string based on the derived second symmetric cryptographic key and the displayed first character string; and in response to the received second character string matching the determined third character string, determining the authentication of the user to be successful.

In an example embodiment, alternatively or in addition to the above-described example embodiments, the first character string comprises one of a randomly generated character string and a sequentially generated character string.

In an example embodiment, alternatively or in addition to the above-described example embodiments, the second symmetric cryptographic key is derived based additionally on contextual information.

In an example embodiment, alternatively or in addition to the above-described example embodiments, the contextual information comprises at least one of a validity period for the second symmetric cryptographic key or a role for the user.

In an example embodiment, alternatively or in addition to the above-described example embodiments, the derived second symmetric cryptographic key is additionally specific at least to the validity period or the role, respectively.

In an example embodiment, alternatively or in addition to the above-described example embodiments, the industrial system comprises at least an industrial machine or an operational technology, OT, system.

In an example embodiment, alternatively or in addition to the above-described example embodiments, the industrial system comprises an off-line industrial system.

An example embodiment of a second apparatus associated with a backend system comprises at least one processor, at least one memory including computer program code, and a second storage configured to store a first symmetric cryptographic key specific to an industrial system. The at least one memory and the computer program code are configured to, with the at least one processor, cause the second apparatus at least to: obtain a user identifier uniquely associated with a user; derive a second symmetric cryptographic key specific at least to the user based at least on the obtained user identifier and the stored first symmetric cryptographic key; and provide the user access to the derived second symmetric cryptographic key.

An example embodiment of a second apparatus associated with a backend system comprises means for performing: causing the second apparatus to obtain a user identifier uniquely associated with a user; deriving a second symmetric cryptographic key specific at least to the user based at least on the obtained user identifier and a first symmetric cryptographic key specific to an industrial system and stored in a second storage in the second apparatus; and providing the user access to the derived second symmetric cryptographic key.

An example embodiment of a method comprises: obtaining, by a second apparatus associated with a backend system, a user identifier uniquely associated with a user; deriving, by the second apparatus, a second symmetric cryptographic key specific at least to the user based at least on the obtained user identifier and a first symmetric cryptographic key specific to an industrial system and stored in a second storage in the second apparatus; and providing, by the second apparatus, the user access to the derived second symmetric cryptographic key.

An example embodiment of a computer program comprises instructions for causing a second apparatus associated with a backend system to perform at least the following: obtaining a user identifier uniquely associated with a user; deriving a second symmetric cryptographic key specific at least to the user based at least on the obtained user identifier and a first symmetric cryptographic key specific to an industrial system and stored in a second storage in the second apparatus; and providing the user access to the derived second symmetric cryptographic key.

DESCRIPTION OF THE DRAWINGS

The accompanying drawings, which are included to provide a further understanding of the embodiments and constitute a part of this specification, illustrate embodiments and together with the description help to explain the principles of the embodiments. In the drawings.

Like reference numerals are used to designate like parts in the accompanying drawings.

DETAILED DESCRIPTION

Reference will now be made in detail to embodiments, examples of which are illustrated in the accompanying drawings. The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
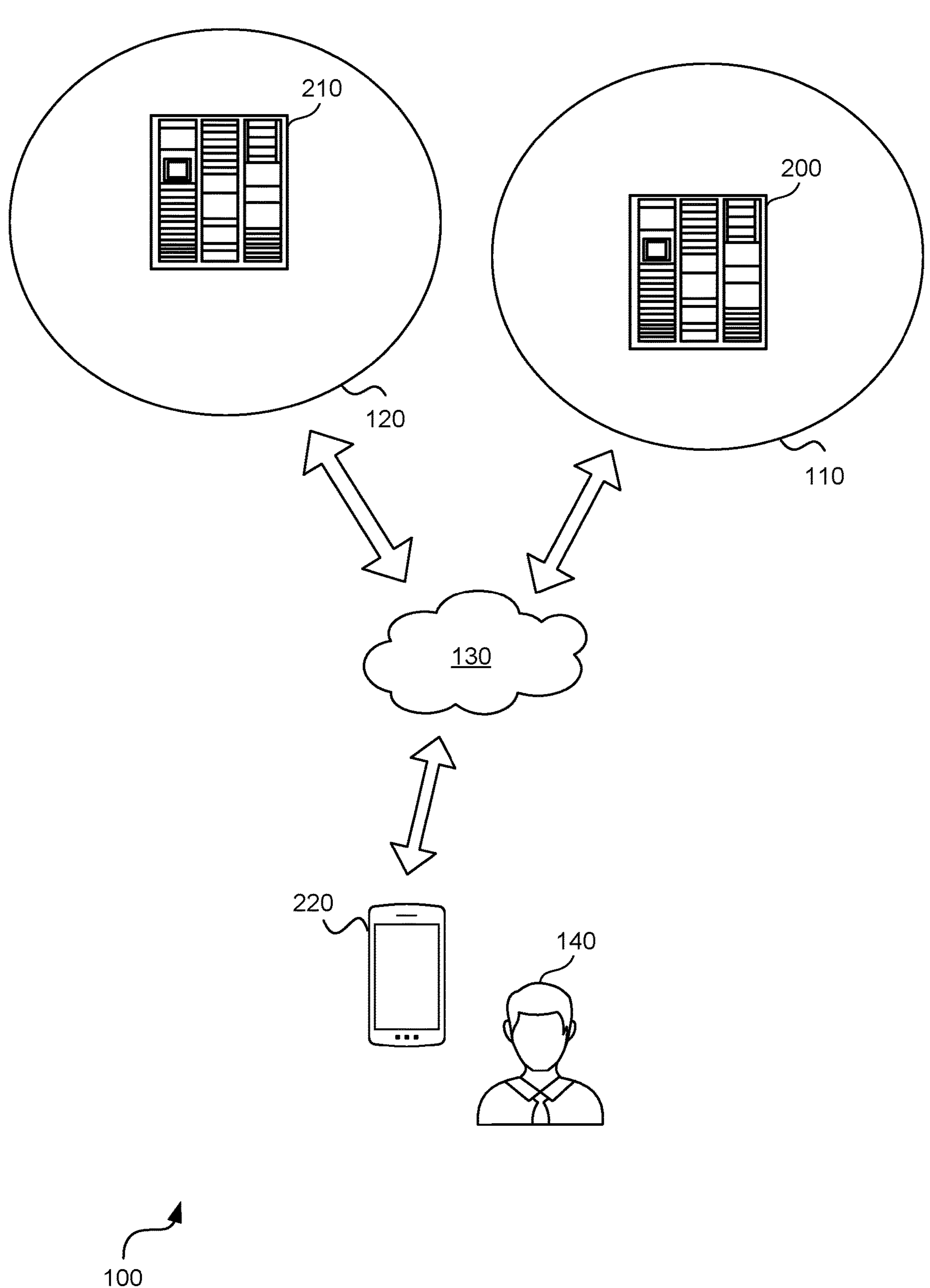
FIG. 1 shows an example embodiment of the subject matter described herein illustrating an example system, where various embodiments of the present disclosure may be implemented.

FIG. 1 illustrates an example system 100, where various embodiments of the present disclosure may be implemented. The system 100 comprises a first apparatus 200 associated with an industrial system 110. For example, the industrial system 110 may comprise an industrial machine (e.g., a mining machine or a construction machine) or plant, or an operational technology (OT) system. The industrial system 110 may comprise an off-line industrial system. In other words, the industrial system 110 may function as a target system for authentication of a user 140, as described in more detail below. The first apparatus 200 may comprise, for example, a computing device suitable for controlling access to the industrial system 110. Herein, the term "off-line" is used to refer both to a permanently off-line industrial system and to a temporarily off-line industrial system (for example, due to temporarily challenging circumstances, such as being temporarily located underground).

At least in some embodiments, the industrial system 110 may not be connected to any network continuously. At least in some embodiments, the industrial system 110 may not be remotely reachable for configuration updates, such as provisioning service persons and/or user permissions by a service provider or an asset owner. At least in some embodiments, system clocks in the industrial system 110 may not be accurately synchronized. At least in some embodiments, the industrial system 110 may not include hardware support for external authenticator devices, such as suitable smart card readers, NFC (near-field communication) devices, or available USB (Universal Serial Bus) ports. In some embodiments, the only way to authenticate to a machine or the like of the industrial system 110 may comprise entering text through a user interface of the machine or the like of the industrial system 110. Such a user interface may include, for example, a means to display information to the user 140 and/or a means for the user 140 to enter text and/or numbers. In some embodiments (related to, e.g., diamond mines and the like), the service personnel are not allowed to bring any devices to the machines. They may only bring authentication codes or passwords printed on paper.

The system 100 further comprises a second apparatus 210 associated with a backend system 120. The backend system 120 is related to the industrial system 110. The second apparatus 210 may comprise a computing device, for example, a server device and/or a cloud computing device. For example, the backend system 120 may be used by users to request access and be granted non-standing access to specific machines or the like of the industrial system 110. The cloud computing device may be configured to be a part of a cloud service, such as a platform-as-a-service (PaaS) type cloud service, an infrastructure-as-a-service (IaaS) type cloud service, a cloud service provided by an asset owner of the industrial system 110 (for example, at a machine hall associated with the industrial system 110), or the like.

The system 100 may further comprise a client device 220 associated with a user 140. The user 140 may be, for example, a service person or the like assigned to service one or more machines or the like in the industrial system 110. The client device 220 may include, for example, a mobile phone, a smartphone, a tablet computer, a smart watch, or any hand-held, portable and/or wearable device.

The first apparatus 200, the second apparatus 210 and/or the client device 220 may be configured to communicate with each other via a communication network 130. The communication network 130 may comprise wired and/or wireless sub-network(s).

The disclosure may be used, for example, in the following use cases:

- authenticating to a machine or the like of the industrial system 110 using a local user interface of the machine,
- authenticating to a machine or the like of the industrial system 110 in a web application that the machine provides over a Wi-Fi interface, and/or
- authenticating to a machine or the like of the industrial system 110 over an SSH (secure shell) protocol connection.

In the following, various example embodiments will be discussed. At least some of these example embodiments may allow authentication of the user 140 in the industrial system 110.

Figure 2A:
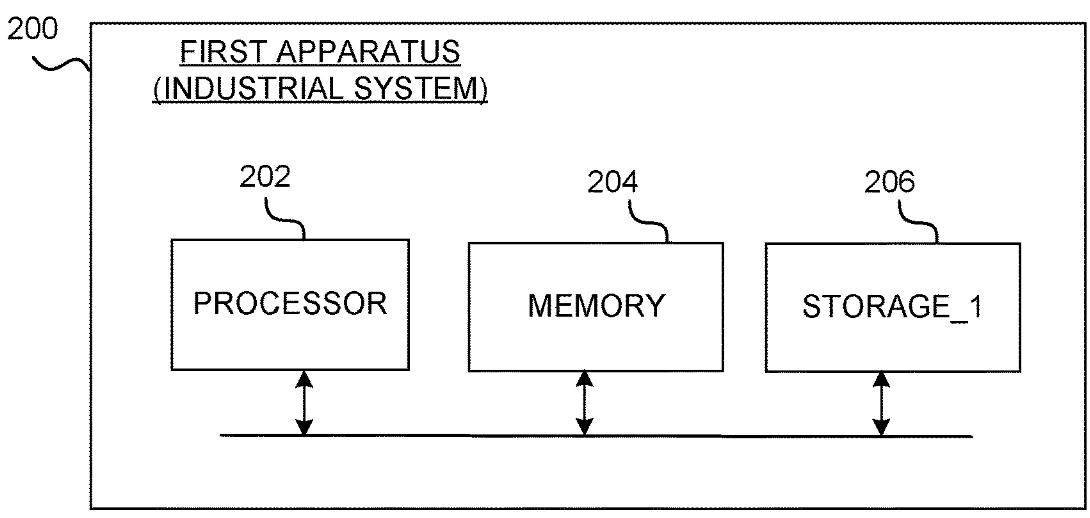
FIG. 2A shows an example embodiment of the subject matter described herein illustrating an example first apparatus associated with an industrial system, where various embodiments of the present disclosure may be implemented.

FIG. 2A is a block diagram of the first apparatus 200 associated with the industrial system 110, in accordance with an example embodiment.

The first apparatus 200 comprises one or more processors 202, one or more memories 204 that comprise computer program code, and a first storage 206 configured to store a first symmetric cryptographic key 301 specific to the industrial system 110. The first storage 206 may comprise a secure storage.

For example, when a machine or the like of the industrial system 110 is commissioned, a first symmetric key ($K_{machine}$) 301 may be established and shared between the machine or the like of the industrial system 110 and the backend system 120. Both may be configured to store the first symmetric cryptographic key 301 securely, and neither may give users direct access to the first symmetric cryptographic key 301.

The first apparatus 200 may also include other elements not shown in FIG. 2A, such as a transceiver configured to enable the first apparatus 200 to transmit and/or receive information to/from other devices, in a wireless and/or wired manner. Furthermore, the first apparatus 200 may include one or more human interface devices, such as a keyboard and/or a display, via which the first apparatus 200 may be configured to interact with the user 140. Alternatively/additionally, the client device 220 may include one or more human interface devices, such as a keyboard and/or a display, via which the first apparatus 200 may be configured to interact with the user 140 when connected (in a wired and/or wireless manner) with the client device 220.

Although the first apparatus 200 is depicted to include only one processor 202, the first apparatus 200 may include more processors. In an embodiment, the memory 204 is capable of storing instructions, such as an operating system and/or various applications. Furthermore, the memory 204 may include a storage that may be used to store, for example, at least some of the information and data used in the disclosed embodiments. At least in some embodiments, the memory 204 may include the first storage 206. In other embodiments, the first storage 206 may be external to the memory 204.

Furthermore, the processor 202 is capable of executing the stored instructions. In an embodiment, the processor 202 may be embodied as a multi-core processor, a single core processor, or a combination of one or more multi-core processors and one or more single core processors. For example, the processor 202 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, a neural network chip, an artificial intelligence (AI) accelerator, or the like. In an embodiment, the processor 202 may be configured to execute hard-coded functionality. In an embodiment, the processor 202 is embodied as an executor of software instructions, wherein the instructions may specifically configure the processor 202 to perform the algorithms and/or operations described herein when the instructions are executed.

The memory 204 may be embodied as one or more volatile memory devices, one or more non-volatile memory devices, and/or a combination of one or more volatile memory devices and non-volatile memory devices. For example, the memory 204 may be embodied as semiconductor memories (such as mask ROM, PROM (programmable ROM), EPROM (erasable PROM), flash ROM, RAM (random access memory), etc.).

The at least one memory 204 and the computer program code are configured to, with the at least one processor 202, cause the first apparatus 200 at least to receive a user identifier (e.g., a user name) uniquely associated with the user 140. The receiving of the user identifier may be as a result of the user 140 initiating execution of authentication with the first apparatus 200 after having been provided access to a derived second symmetric cryptographic key 302 by the second apparatus 210, as described in more detail below.

The at least one memory 204 and the computer program code are further configured to, with the at least one processor 202, cause the first apparatus 200 to derive a second symmetric cryptographic key 302 specific at least to the user 140 based at least on the received user identifier and the stored first symmetric cryptographic key 301.

At least in some embodiments, the second symmetric cryptographic key 302 may be derived based additionally on contextual information. At least in some embodiments, the contextual information may define at least one context and/or condition for the use of the the second symmetric cryptographic key 302. For example, the contextual information may comprise time related definitions, such as a validity period for the second symmetric cryptographic key 302, and/or privilege level information, such as a role for the user 140.

For example, the first apparatus 200 may receive the contextual information from the user when the user enters it. Alternatively, the contextual information may be obtained or determined in another manner. For example, in the case of the validity period for the second symmetric cryptographic key 302, the contextual information may be obtained from a system clock. In case of the role for the user 140, the role may be determined by use case based on preconfigured information, for example. As an example, maintenance console access with SSH may be preconfigured to require a specific system administrator role.

For example, the user-specific second symmetric cryptographic key 302 ($K_{user}$) may be derived from at least the user identifier and $K_{machine}$ using a key derivation function $f_1$. Additional contextual information can also be included in the key derivation:

$$K_{user} = f_1\,(K_{machine},\ \text{username, additional contextual information})$$

The user identifier may comprise, for example, the user's email address or the user's username. The additional contextual information may comprise, for example, a validity period when the user-specific second symmetric cryptographic key 302 is valid (such as a certain week or a month, or a serial number of the validity period), and/or a role that the user 140 is authorized to have in the industrial system 110.

At least in some embodiments, when the contextual information comprises the validity period, the derived second symmetric cryptographic key 302 may additionally be specific to the validity period. When the contextual information comprises the role, the derived second symmetric cryptographic key 302 may additionally be specific to the role.

For example, if the contextual information for $f_1$ includes a validity period, then the user 140 may only be given non-standing access. If the contextual information for $f_1$ includes a role, then the user's access may be limited to the privileges that have been granted to the role. This may allow following the principle of least privilege.

For example, the user's required role in the contextual information may be determined by the context of a use case. For example, if the user is connecting to the first apparatus 200 using the SSH protocol, the role may be predetermined to always be a certain role. In this case, for example, the SSH service on the first apparatus 200 may be configured to advise the user as to which role to select in the client device 220/authenticator application.

Alternatively/additionally, the first apparatus 200 may be configured to let the user choose the role that the user wants to use. The user may then select the same role in the client device 220/authenticator application which possesses the user-specific second symmetric cryptographic key 302 for the required role.

The at least one memory 204 and the computer program code are further configured to, with the at least one processor 202, cause the first apparatus 200 to attempt to authenticate the user based at least on the derived second symmetric cryptographic key 302.

At least in some embodiments, the authentication of the user may comprise authentication based on using the derived second symmetric cryptographic key 302 as a password in a password-based authentication protocol. Alternatively/additionally, the authentication of the user may comprise authentication based on using the derived second symmetric cryptographic key 302 as a basis for determining a password for a password-based authentication protocol. Alternatively/additionally, the authentication of the user may comprise authentication based on using the derived second symmetric cryptographic key 302 in transport level security, TLS, authentication. Alternatively/additionally, the authentication of the user may comprise authentication based on using the derived second symmetric cryptographic key 302 in determining (e.g., calculating) a token or an authentication header for a HTTPS (hypertext transfer protocol secure) REST (representational state transfer) API (application programming interface) call.

At least in some embodiments, the authentication of the user may comprise authentication based on using the derived second symmetric cryptographic key 302 in challenge-response authentication. For example, the using of the derived second symmetric cryptographic key 302 in the challenge-response authentication may comprise: displaying at least a first character string as a challenge; receiving at least a second character string as response to the challenge; determining a third character string based on the derived second symmetric cryptographic key and the displayed first character string; and in response to the received second character string matching the determined third character string, determining the authentication of the user to be successful. For example, the first character string may comprise a randomly generated character string or a sequentially generated character string.

The at least one memory 204 and the computer program code are further configured to, with the at least one processor 202, cause the first apparatus 200 to grant the user access to the industrial system 110 in response to successfully authenticating the user. For example, the access to be granted may comprise maintenance access, operating access, and/or the like.

Figure 3:
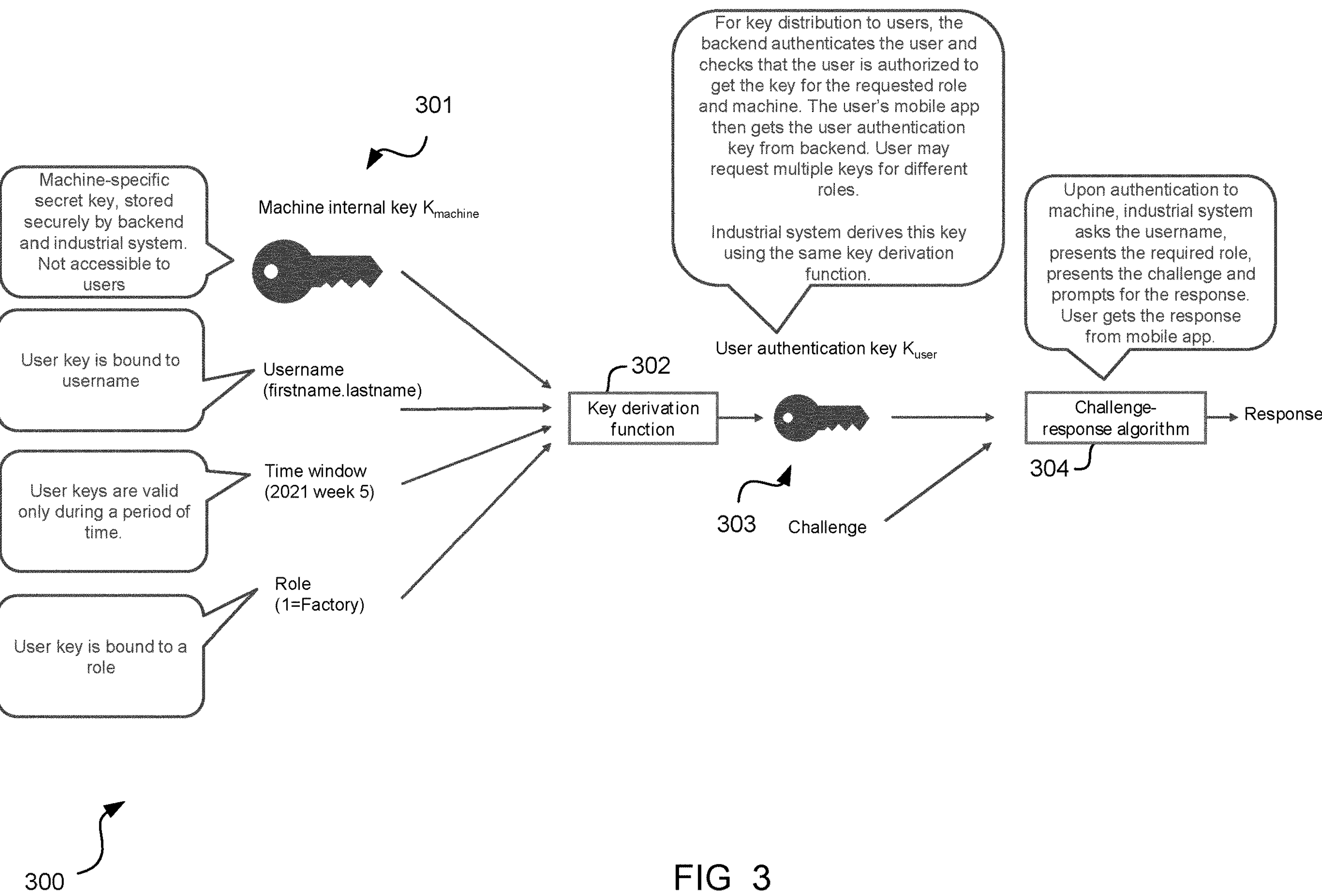
FIG. 3 shows an example embodiment of the subject matter described herein illustrating an example of challenge-response authentication.

FIG. 3 shows an example embodiment of the subject matter described herein illustrating an example of challenge-response authentication.

Challenge-response authentication is a family of protocols in which one party presents a question ("challenge") and another party must provide a valid answer ("response") to be authenticated. Typically, the challenge may be generated with a cryptographically secure pseudorandom number generator, and the response may be calculated from a challenge and a shared secret. The response is also called a one-time password (OTP).

In the challenge response authentication of the disclosure, the client device 220/authenticator mobile application and the machine or the like of the industrial system 110 may include the same implementation of a challenge-response authentication function $f_2$:

$$\text{response} = f_2(K_{user}, \text{challenge})$$

Upon authentication to the machine or the like of the industrial system 110, using a machine user interface (UI) or an UI of the client device 220 connected to the machine:

1) the machine or the like of the industrial system 110 may be configured to prompt for user identifier,
2) the machine or the like of the industrial system 110 may be configured to present or prompt for additional contextual information (using, for example, a role selection drop-down list),
3) the machine or the like of the industrial system 110 may be configured to present the challenge, which is, for example, a short random number or a randomly selected string, and
4) the machine or the like of the industrial system 110 may be configured to prompt for the response, which is, for example, a short number or string.

Using, for example, the client device 220/authenticator mobile application, the user 140 may select the correct machine and enter the challenge and the possible additional contextual information to the client device 220/authenticator mobile application. The client device 220/authenticator mobile application may be configured to calculate the response using $f_2$ and a user-specific second symmetric cryptographic key 302 that matches with the selected machine or the like and the provided additional contextual information.

The user 140 may enter the response to the machine or the like of the industrial system 110. The machine or the like of the industrial system 110 may be configured to check whether the response is correct by calculating the user-specific second symmetric cryptographic key 302 $K_{user}$ using the function $f_1$ and the correct response using the function $f_2$.

For example, in some mines, the service personnel may not be allowed to bring any devices close to the machines or the like of the industrial system 110. The users may be allowed to bring a piece of paper. For these environments, the challenge-response algorithm may be modified so that the challenge is not random but a sequential series of integer numbers. This may allow the user to print out or write down the next response codes outside the mine, and then authenticate to the machine or the like of the industrial system 110 with just the next codes on a piece of paper, thereby allowing the user to authenticate to machines or the like of the industrial system 110 without any devices of their own.

It is to be noted that the user-specific second symmetric cryptographic key 302 $K_{user}$ may be used for any symmetric key based authentication protocols or shared secret-based protocols besides challenge-response authentication. For example, the user-specific second symmetric cryptographic key 302 may be used directly as a password in any password-based protocol, or as a symmetric key based transport level security (TLS) authentication, or for calculating tokens or authentication headers for HTTPS REST API calls.

As discussed above, a validity period for the validity of the user-specific second symmetric cryptographic key 302 may be included as contextual information in the derivation of the second symmetric cryptographic key 302. Both the first apparatus 200 and the second apparatus 210 may use the current validity period as a parameter for the function $f2$ when deriving the user-specific second symmetric cryptographic key 302. For example, in an embodiment, calendar months may be used for the validity periods, and include the validity periods as a string of YYYY-MM (for example "2021-11") in the contextual information, for example. In another embodiment, a common numbering scheme for the used validity periods may be agreed upon so that the serial number of a used validity period may be included in the contextual information, for example.

Optionally, the first apparatus 200 may be configured to use subsequent validity periods to derive alternative user-specific second symmetric cryptographic keys 302. In this case, the first apparatus 200 may be configured to accept different responses during a challenge-response authentication. This may compensate for possible inaccuracies in clock synchronization.

The user 140 may request access to multiple machines or the like of the industrial system 110 at once at the second apparatus 210. For example, the user 140 may request access to all the machines of a certain customer site. In this case, the user's client device 220/authenticator application may receive a separate user-specific second symmetric cryptographic key 302 for each machine.

When roles are included in the contextual information, the user 140 may request multiple user-specific keys for a single machine or the like of the industrial system 110, one per each role. This allows the user to authenticate to the machine or the like of the industrial system 110 in different contexts or using the least powerful role for the required task to avoid unnecessary privileges. Depending on the policy, it may also be possible to grant the user 140 multiple keys with different validity periods at once, for example, to prepare for a long business trip to a customer site.

Multi-factor authentication refers to authentication that uses more than one of three authentication factor types:

1. something one knows (such as a password or a PIN (personal identification number) code),
2. something one has (such as an authenticator device),
3. something one is (e.g., a biometric factor, such as a fingerprint or a face scan).

Multi-factor authentication may be required when there is a need to ensure that strong authentication is in place. For example, the IEC 62443 standard requires multi-factor authentication in some cases on certain security levels.

At least some embodiments of the disclosure may be used to implement multi-factor authentication so that the client device 220 that holds the user-specific keys (e.g., in the authenticator application) is a factor of Type 2 (something one has). The authenticator application may be implemented so that activating the application requires another factor, such as a passcode (Type 1 factor) or a biometric factor (Type 3 factor).

Figure 4:
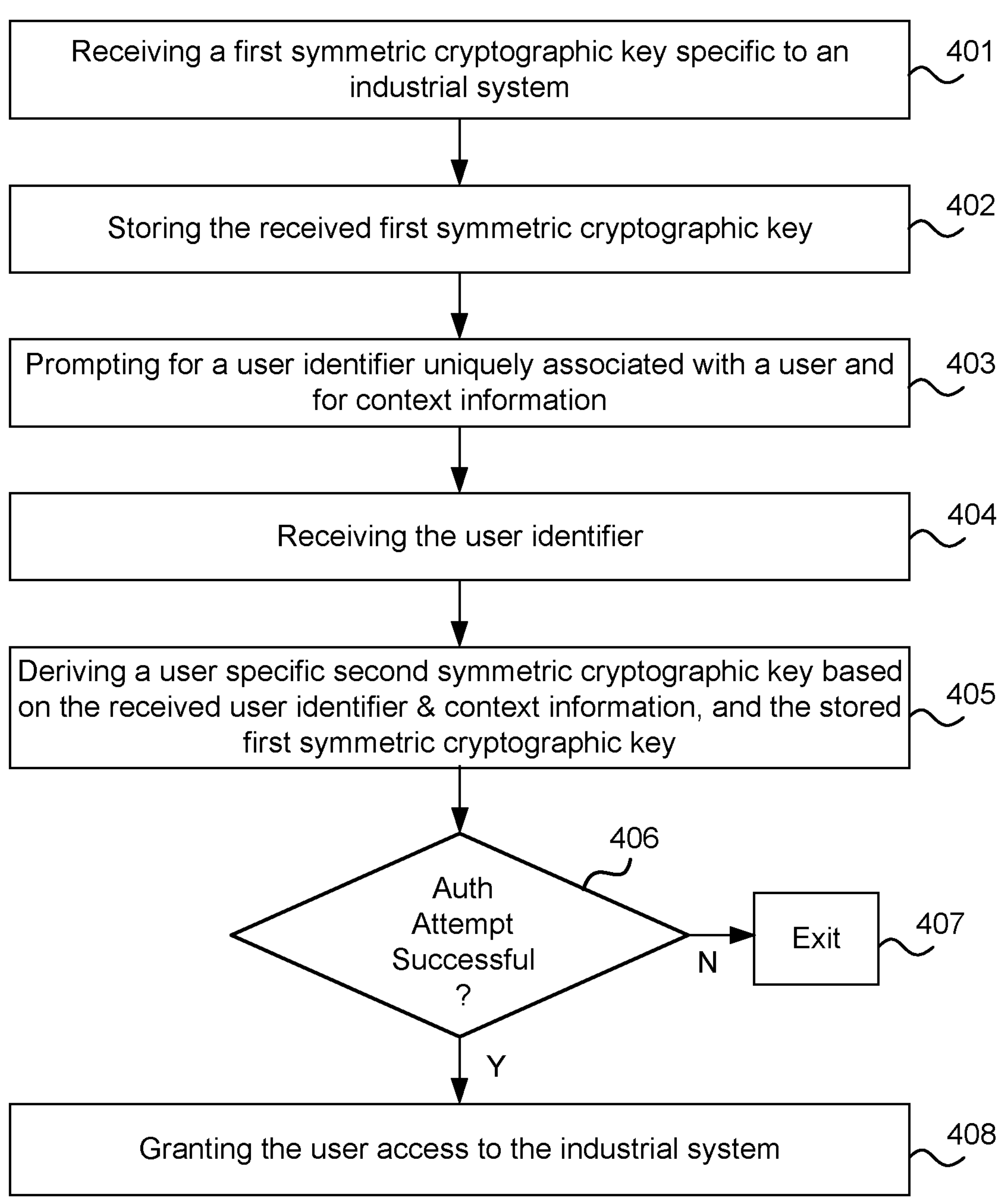
FIG. 4 shows an example embodiment of the subject matter described herein illustrating a method.

FIG. 4 illustrates an example flow chart of a method 400, in accordance with an example embodiment. In the example of FIG. 4, the method comprises a computer-implemented method.

At optional operation 401, the first apparatus 200 associated with the industrial system 110 may receive a first symmetric cryptographic key 301 specific to the industrial system 110.

At optional operation 402, the first apparatus 200 may store the first symmetric cryptographic key 301 in the first storage 206 of the first apparatus 200.

At optional operation 403, the first apparatus 200 may prompt the user 140 for a user identifier uniquely associated with the user 140, and optionally for contextual information.

At operation 404, the first apparatus 200 receives at least the user identifier.

At operation 405, the first apparatus 200 derives the second symmetric cryptographic key 302 specific at least to the user 140 based at least on the received user identifier and the first symmetric cryptographic key 301 specific to the industrial system 110 and stored in the first storage 206 in the first apparatus 200, and optionally based additionally on contextual information.

At operation 406, the first apparatus 200 attempts to authenticate the user 140 based at least on the derived second symmetric cryptographic key 302.

If the authentication attempt fails, the method 400 exits, operation 407.

At operation 408, the first apparatus 200 grants the user 140 access to the industrial system 110 in response to successfully authenticating the user 140.

The method 400 may be performed by the first apparatus 200 of FIG. 2A. The operations 401-408 can, for example, be performed by the at least one processor 202 and the at least one memory 204. Further features of the method 400 directly result from the functionalities and parameters of the first apparatus 200, and thus are not repeated here. The method 400 can be performed by computer program(s).

Figure 2B:
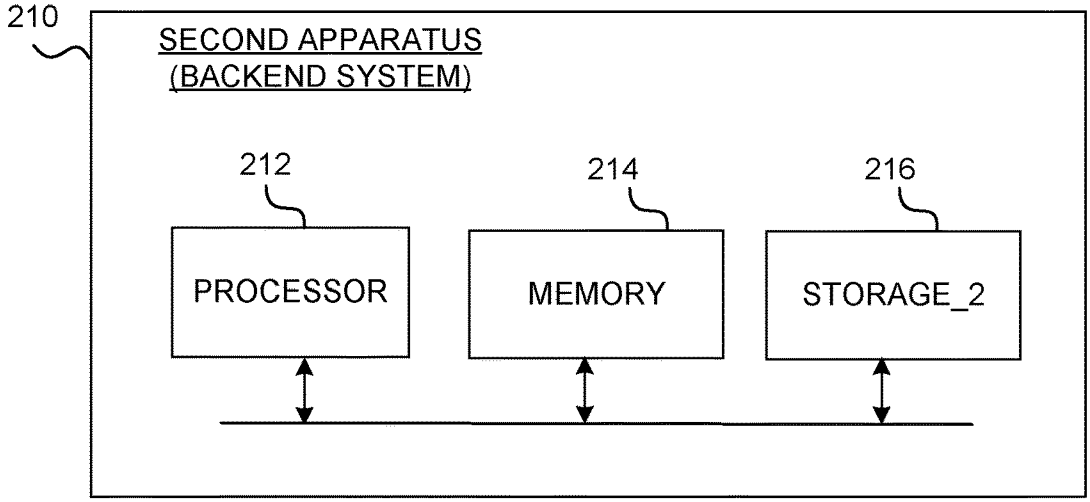
FIG. 2B shows an example embodiment of the subject matter described herein illustrating an example second apparatus associated with a backend system, where various embodiments of the present disclosure may be implemented.

FIG. 2B is a block diagram of the second apparatus 210 associated with the backend system 120, in accordance with an example embodiment.

The second apparatus 210 comprises one or more processors 212, one or more memories 214 that comprise computer program code, and a second storage 216 configured to store the first symmetric cryptographic key 301 specific to the industrial system 110. The second storage 216 may comprise a secure storage.

As discussed above in connection with FIG. 2A, when a machine or the like of the industrial system 110 is commissioned, a first symmetric key ($K_{machine}$) 301 may be established and shared between the machine or the like of the industrial system 110 and the backend system 120. Both may be configured to store the first symmetric cryptographic key 301 securely, and neither may give users direct access to the first symmetric cryptographic key 301.

The second apparatus 210 associated with the backend system 120 may also be configured to record other key information about the commissioned new machine or the like, such as an identifier and a location of the machine or the like in a hierarchy of asset owners, sites and/or plants. Each machine or the like may have sufficient identification information to allow users to be able to tell which machine or the like they are trying to authenticate with. The second apparatus 210 may also be configured to record an exact form of the user identifier for each second symmetric key. The exact form of the user identifier may be displayed to the user upon the user's 140 authentication to the first apparatus 200, so that the user 140 will know how to enter the user identifier exactly.

The second apparatus 210 may also include other elements not shown in FIG. 2B, such as a transceiver configured to enable the second apparatus 210 to transmit and/or receive information to/from other devices, in a wireless and/or wired manner.

Although the second apparatus 210 is depicted to include only one processor 212, the second apparatus 210 may include more processors. In an embodiment, the memory 214 is capable of storing instructions, such as an operating system and/or various applications. Furthermore, the memory 214 may include a storage that may be used to store, for example, at least some of the information and data used in the disclosed embodiments. At least in some embodiments, the memory 214 may include the second storage 216. In other embodiments, the second storage 216 may be external to the memory 214.

Furthermore, the processor 212 is capable of executing the stored instructions. In an embodiment, the processor 212 may be embodied as a multi-core processor, a single core processor, or a combination of one or more multi-core processors and one or more single core processors. For example, the processor 212 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, a neural network chip, an artificial intelligence (AI) accelerator, or the like. In an embodiment, the processor 212 may be configured to execute hard-coded functionality. In an embodiment, the processor 212 is embodied as an executor of software instructions, wherein the instructions may specifically configure the processor 212 to perform the algorithms and/or operations described herein when the instructions are executed.

The memory 214 may be embodied as one or more volatile memory devices, one or more non-volatile memory devices, and/or a combination of one or more volatile memory devices and non-volatile memory devices. For example, the memory 214 may be embodied as semiconductor memories (such as mask ROM, PROM (programmable ROM), EPROM (erasable PROM), flash ROM, RAM (random access memory), etc.).

The at least one memory 214 and the computer program code are configured to, with the at least one processor 212, cause the second apparatus 210 at least to obtain the user identifier uniquely associated with the user 140.

For example, the second apparatus 210 may obtain the user identifier by receiving it (from the user 140, for example). Alternatively, the second apparatus 210 may obtain the user identifier by determining it (based at least partially on acquired external information, for example). In an example, the external information may be acquired from an identity and access management (IAM) system, or the like. For example, if the user 140 logs in as firstname.lastname using an account of a company "company_name", then the user identifier firstname.lastname@company_name.com may be used, as the IAM system or the like may report this user identifier as the user's identifier.

The at least one memory 214 and the computer program code are further configured to, with the at least one processor 212, cause the second apparatus 210 to derive the second symmetric cryptographic key 302 specific at least to the user 140 based at least on the obtained user identifier and the stored first symmetric cryptographic key 301. As discussed in more detail in connection with FIG. 2A, the second symmetric cryptographic key 302 may be derived based additionally on contextual information. For example, the second symmetric cryptographic key 302 may be derived in response to the user 140 being granted access to a machine or the like of the industrial system 110.

The at least one memory 214 and the computer program code may be further configured to, with the at least one processor 212, cause the second apparatus 210 to support requesting access to the machine or the like of the industrial system 110, and/or to support approving the access request and granting access. At least in some embodiments, the backend system 120 may authenticate users and/or perform authorization checks to access requests and/or access grants before the deriving of the second symmetric cryptographic key 302.

The at least one memory 214 and the computer program code are further configured to, with the at least one processor 212, cause the second apparatus 210 to provide the user access to the derived second symmetric cryptographic key 302.

At least in some embodiments, the access to the derived second symmetric cryptographic key 302 to be provided may comprise transmitting the derived second symmetric cryptographic key 302 (or a copy thereof) and optionally the used user identifier (for example, so that the user 140 can be shown the exact format of the required user identifier for the target machine or the like of the industrial system 110) and/or contextual information (such as the used roles and/or validity period so that they can be displayed to the user 140 by the client device 220) to the client device 220 associated with the user 140. In some embodiments, the client device 220 may have to authenticate to the backend system 120 before it can receive the derived second symmetric cryptographic key 302. In such embodiments, only the second symmetric cryptographic key 302 associated with the authenticated user may be transmitted to the client device 220.

In other embodiments, the access to the derived second symmetric cryptographic key 302 to be provided may comprise storing the derived second symmetric cryptographic key 302 at least temporarily in the second apparatus 210 (or, e.g., in an associated cloud-based service) and providing the client device 220 access to the stored second symmetric cryptographic key 302, or access to information derived from the second symmetric cryptographic key 302, such as a password or a response for a challenge-response authentication.

In yet other embodiments, the access to the derived second symmetric cryptographic key 302 to be provided may comprise storing the derived second symmetric cryptographic key 302 at least temporarily in the second apparatus 210 (or, e.g., in an associated cloud-based service) and providing the user 140 (without the client device 220) access to the stored second symmetric cryptographic key 302 or access to the above-discussed information derived from the stored second symmetric cryptographic key 302. That is, in these embodiments the user 140 may interact with the second apparatus 210 (or, e.g., an associated cloud-based service) directly via suitable interface means associated with the second apparatus 210.

Further features (related to, e.g., the first symmetric cryptographic key 301, the second symmetric cryptographic key 302, the contextual information, the user identifier, etc.) of the second apparatus 210 directly result from the functionalities and parameters of the first apparatus 200 and thus are not repeated here.

Figures 5, 6:
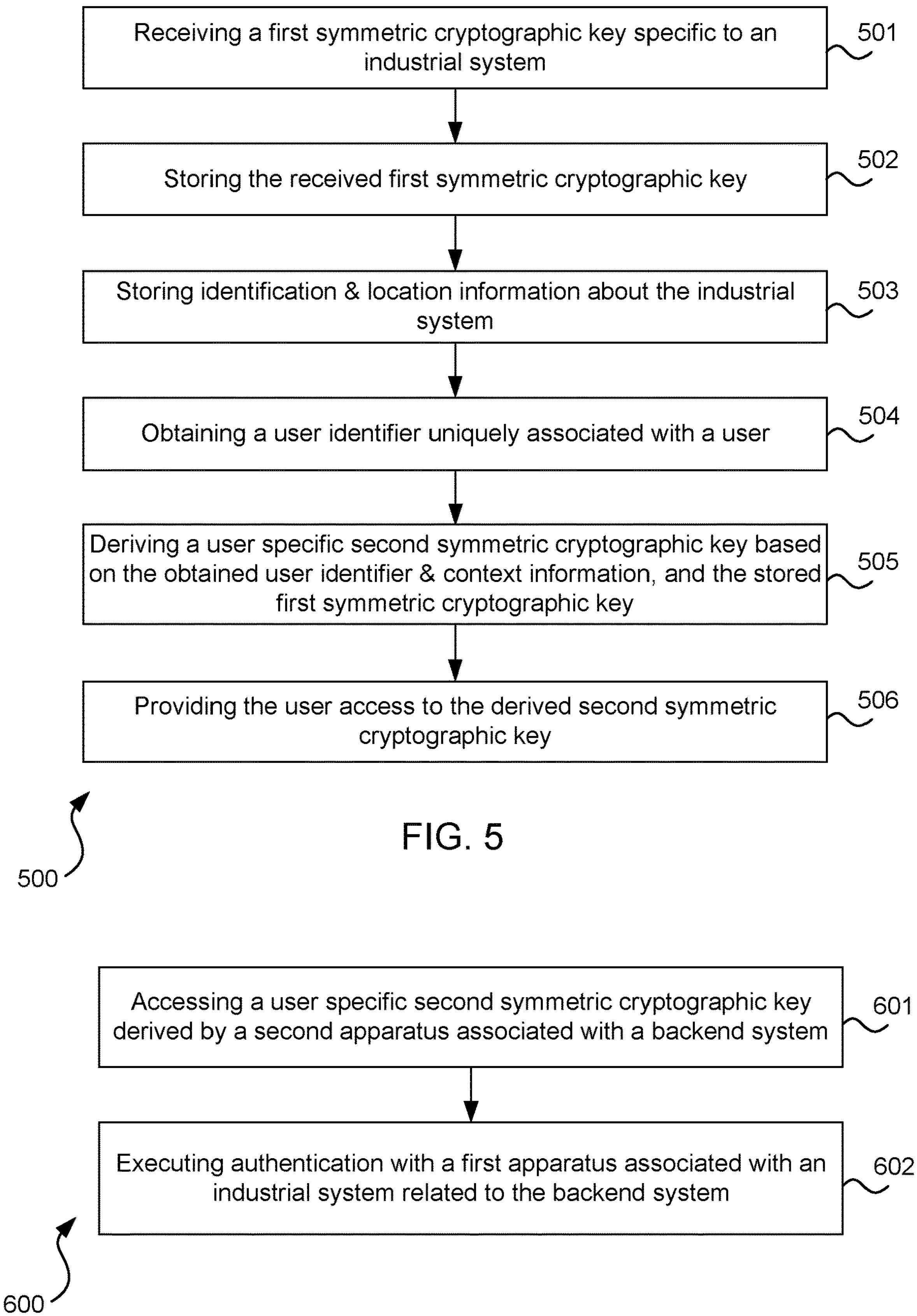
FIG. 5 shows an example embodiment of the subject matter described herein illustrating another method.
FIG. 6 shows an example embodiment of the subject matter described herein illustrating yet another method.

FIG. 5 illustrates an example flow chart of a method 500, in accordance with an example embodiment. In the example of FIG. 5, the method comprises a computer-implemented method.

At optional operation 501, the second apparatus 210 associated with the backend system 120 may receive a first symmetric cryptographic key 301 specific to the industrial system 110.

At optional operation 502, the second apparatus 210 may store the first symmetric cryptographic key 301 in the second storage 216 of the second apparatus 210.

At optional operation 503, the second apparatus 210 may store additional information (e.g., identification information and/or location information) about the industrial system 110.

At operation 504, the second apparatus 210 associated with the backend system 120 obtains at least the user identifier uniquely associated with the user 140 and optionally contextual information.

At operation 505, the second apparatus 210 derives the second symmetric cryptographic key 302 specific at least to the user 140 based at least on the obtained user identifier and the first symmetric cryptographic key 301 specific to the industrial system 110 and stored in the second storage 216 in the second apparatus 210, and optionally based additionally on the contextual information.

At operation 506, the second apparatus 210 provides the user 140 access to the derived second symmetric cryptographic key 302.

The method 500 may be performed by the second apparatus 210 of FIG. 2B. The operations 501-506 can, for example, be performed by the at least one processor 212 and the at least one memory 214. Further features of the method 500 directly result from the functionalities and parameters of the second apparatus 210, and thus are not repeated here. The method 500 can be performed by computer program(s).

Figure 2C:
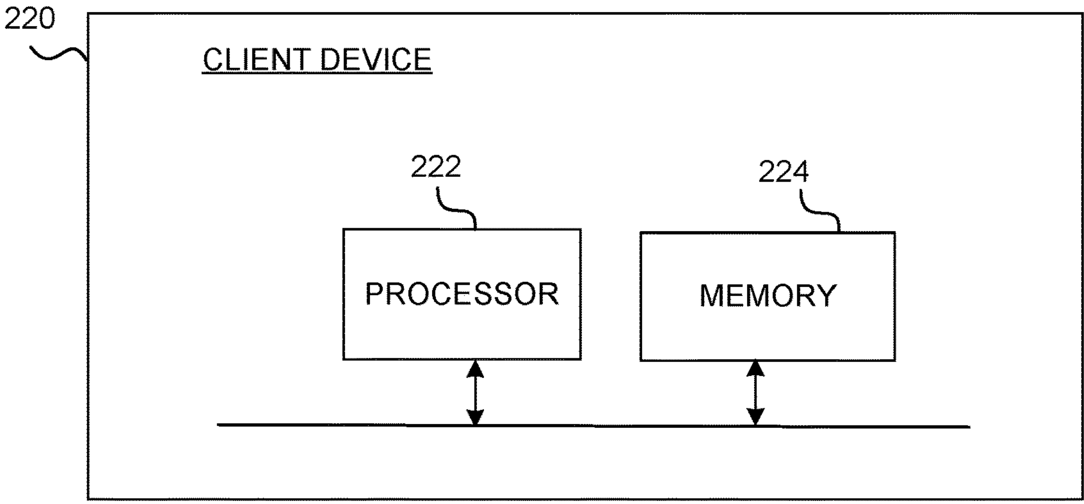
FIG. 2C shows an example embodiment of the subject matter described herein illustrating an example client device, where various embodiments of the present disclosure may be implemented.

FIG. 2C is a block diagram of the client device 220 associated with the user 140, in accordance with an example embodiment.

The client device 220 comprises one or more processors 222 and one or more memories 224 that comprise computer program code. The client device 220 may also include other elements not shown in FIG. 2C, such as a transceiver configured to enable the client device 220 to transmit and/or receive information to/from other devices, in a wireless and/or wired manner.

Although the client device 220 is depicted to include only one processor 222, the client device 220 may include more processors. In an embodiment, the memory 224 is capable of storing instructions, such as an operating system and/or various applications. Furthermore, the memory 224 may include a storage that may be used to store, e.g., at least some of the information and data used in the disclosed embodiments, such as a mobile authenticator application that may be used to execute at least some of the functionalities of the client device 220 described herein.

Furthermore, the processor 222 is capable of executing the stored instructions. In an embodiment, the processor 222 may be embodied as a multi-core processor, a single core processor, or a combination of one or more multi-core processors and one or more single core processors. For example, the processor 222 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, a neural network chip, an artificial intelligence (AI) accelerator, or the like. In an embodiment, the processor 222 may be configured to execute hard-coded functionality. In an embodiment, the processor 222 is embodied as an executor of software instructions, wherein the instructions may specifically configure the processor 222 to perform the algorithms and/or operations described herein when the instructions are executed.

The memory 224 may be embodied as one or more volatile memory devices, one or more non-volatile memory devices, and/or a combination of one or more volatile memory devices and non-volatile memory devices. For example, the memory 224 may be embodied as semiconductor memories (such as mask ROM, PROM (programmable ROM), EPROM (erasable PROM), flash ROM, RAM (random access memory), etc.).

The at least one memory 224 and the computer program code are configured to, with the at least one processor 222, cause the client device 220 at least to access the user 140 specific second symmetric cryptographic key 302 that has been derived by the second apparatus 210 associated with the backend system 120.

In other words, after authorization and key derivation in the second apparatus 210 of the backend system 120 has succeeded, the user's client device 220 (e.g., an authenticator mobile application therein) may be configured to receive or otherwise access $K_{user}$. At least in some embodiments, the client device 220/authenticator app may be configured to store user-specific keys for multiple machines or the like, so it may need to present the machines or the like with some identification information. For instance, the machines or the like may be presented using a hierarchy of asset owner company-site-plant-machine ID.

The at least one memory 224 and the computer program code are further configured to, with the at least one processor 222, cause the client device 220 to execute authentication with the first apparatus 200 associated with the industrial system 110, using at least the accessed second symmetric cryptographic key 302 and the user identifier uniquely associated with the user 140.

In other words, the user is now able to authenticate to the machine or the like. The user 140 may enter his/her user identifier to the machine or the like, and the machine or the like will be able to derive the same $K_{user}$ as above using the same function $f_1$ as above.

Further features (related to, e.g., the first symmetric cryptographic key 301, the second symmetric cryptographic key 302, the contextual information, the user identifier, etc.) of the client device 220 directly result from the functionalities and parameters of the first apparatus 200 and the second apparatus 210, and thus are not repeated here.

FIG. 6 illustrates an example flow chart of a method 600, in accordance with an example embodiment.

At operation 601, the client device 220 associated with the user 140 accesses the user 140 specific second symmetric cryptographic key 302 that has been derived by the second apparatus 210 associated with the backend system 120.

At operation 602, the client device 220 executes authentication with the first apparatus 200 associated with the industrial system 110, using at least the accessed second symmetric cryptographic key 302 and the user identifier uniquely associated with the user 140.

The method 600 may be performed by the client device 220 of FIG. 2C. The operations 601-602 can, for example, be performed by the at least one processor 222 and the at least one memory 224. Further features of the method 600 directly result from the functionalities and parameters of the client device 220, and thus are not repeated here. The method 600 can be performed by computer program(s).

At least some of the embodiments described herein may allow users not needing to be provisioned or configured to the machines or the like of the industrial system 110 in advance.

At least some of the embodiments described herein may allow the machines or the like of the industrial system 110 not needing any network connectivity. Authentication may work even for off-the-grid machines At least some of the embodiments described herein may allow needing no clock synchronization, when granting standing access, or only coarse clock synchronization, when granting non-standing access.

At least some of the embodiments described herein may allow authorization to a specific role.

At least some of the embodiments described herein may allow users to be authenticated uniquely so that the machine or the like of the industrial system 110 gets to authenticate the user's user identifier. This enables an audit trail of the machine or the like of the industrial system 110 to indicate the identity of the users who performed operations.

At least some of the embodiments described herein may allow multi-factor authentication.

At least some of the embodiments described herein may allow requiring no new hardware for the machines or the like of the industrial system 110.

At least some of the embodiments described herein may allow multiple different use cases: web application authentication, local UI panel authentication, SSH authentication, and the like.

At least some of the embodiments described herein may allow requiring only a single symmetric key in each of the first apparatus 200 and the second apparatus 210.

The first apparatus 200 may comprise means for performing at least one method described herein. In one example, the means may comprise the at least one processor 202, and the at least one memory 204 including program code configured to, when executed by the at least one processor, cause the first apparatus 200 to perform the method.

The second apparatus 210 may comprise means for performing at least one method described herein. In one example, the means may comprise the at least one processor 212, and the at least one memory 214 including program code configured to, when executed by the at least one processor, cause the second apparatus 210 to perform the method.

The client device 220 may comprise means for performing at least one method described herein. In one example, the means may comprise the at least one processor 222, and the at least one memory 224 including program code configured to, when executed by the at least one processor, cause the client device 220 to perform the method.

The functionality described herein can be performed, at least in part, by one or more computer program product components such as software components. According to an embodiment, the first apparatus 200, the second apparatus 210, and/or the client device 220 may comprise a processor configured by the program code when executed to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and Graphics Processing Units (GPUs).

Any range or device value given herein may be extended or altered without losing the effect sought. Also, any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the embodiments described above may be combined with aspects of any of the other embodiments described to form further embodiments without losing the effect sought.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A first apparatus associated with an industrial system including an industrial machine, the first apparatus comprising:

at least one processor;

at least one memory including computer program code; and a first storage configured to store a first symmetric cryptographic key established and shared between the industrial machine of the industrial system and a back-end system when commissioning the industrial machine, the first symmetric cryptographic key being specific to the industrial system;

the at least one memory and the computer program code being configured to, with the at least one processor, cause the first apparatus at least to:

receive a user identifier uniquely associated with a user;

derive a second symmetric cryptographic key specific at least to the user based at least on the received user identifier and the stored first symmetric cryptographic key;

attempt to authenticate the user to the industrial machine of the industrial system based at least on the derived second symmetric cryptographic key, wherein the authentication of the user based at least on the derived second symmetric cryptographic key comprises authentication based on using the derived second symmetric cryptographic key in challenge-response authentication comprising:

displaying at least a first character string as a challenge;

receiving at least a second character string as response to the challenge;

determining a third character string based on the derived second symmetric cryptographic key and the displayed first character string;

in response to the received second character string matching the determined third character string, determining the authentication of the user to be successful; and in response to successfully authenticating the user, grant the user access to the industrial machine of the industrial system.

2. The first apparatus according to claim 1, wherein the authentication of the user based at least on the derived second symmetric cryptographic key comprises at least one of: authentication based on using the derived second symmetric cryptographic key as a password in a password-based authentication protocol, authentication based on using the derived second symmetric cryptographic key as a basis for determining a password for a password-based authentication protocol, authentication based on using the derived second symmetric cryptographic key in transport level security, TLS, authentication, or authentication based on using the derived second symmetric cryptographic key in determining a token or an authentication header for a HTTPS REST API call.

3. The first apparatus according to claim 1, wherein the first character string includes one of a randomly generated character string and a sequentially generated character string.

4. The first apparatus according to claim 1, wherein the second symmetric cryptographic key is derived based additionally on contextual information.

5. The first apparatus according to claim 4, wherein the contextual information comprises at least one of a validity period for the second symmetric cryptographic key or a role for the user.

6. The first apparatus according to claim 5, wherein the derived second symmetric cryptographic key is additionally specific at least to the validity period or the role, respectively.

7. The first apparatus according to claim 1, wherein the industrial system includes an operational technology, OT, system.

8. The first apparatus according to claim 1, wherein the industrial system comprises an off-line industrial system.

9. The first apparatus according to claim 1, wherein authenticating comprises authenticating to the machine of the industrial system using a local user interface of the machine, authenticating to the machine of the industrial system in a web application that the machine provides over a Wi-Fi interface and/or authenticating to the machine of the industrial system over an SSH protocol connection.

10. A method, comprising:

receiving, at a first apparatus associated with an industrial system comprising an industrial machine, a user identifier uniquely associated with a user;

deriving, by the first apparatus, a second symmetric cryptographic key specific at least to the user based at least on the received user identifier and a first symmetric cryptographic key established and shared between the industrial machine of the industrial system and a backend system when commissioning the industrial machine, the first symmetric cryptographic key being specific to the industrial system and stored in a first storage in the first apparatus;

attempting, by the first apparatus, to authenticate the user to the industrial machine of the industrial system based at least on the derived second symmetric cryptographic key, wherein the authentication of the user based at least on the derived second symmetric cryptographic key comprises authentication based on using the derived second symmetric cryptographic key in challenge-response authentication comprising:

displaying at least a first character string as a challenge;

receiving at least a second character string as response to the challenge;

determining a third character string based on the derived second symmetric cryptographic key and the displayed first character string;

in response to the received second character string matching the determined third character string, determining the authentication of the user to be successful; and in response to successfully authenticating the user, granting, by the first apparatus, the user access to the industrial machine of the industrial system.

11. A non-transitory computer readable medium comprising computer program instructions, which, when executed in a data processing apparatus, causes a first apparatus associated with an industrial system comprising an industrial machine to perform at least the following:

receiving a user identifier uniquely associated with a user;

deriving a second symmetric cryptographic key specific at least to the user based at least on the received user identifier and a first symmetric cryptographic key established and shared between the industrial machine of the industrial system and a backend system when commissioning the machine, the first symmetric cryptographic key being specific to the industrial system and stored in a first storage in the first apparatus;

attempting to authenticate the user to the industrial machine of the industrial system based at least on the derived second symmetric cryptographic key, wherein the authentication of the user based at least on the derived second symmetric cryptographic key comprises authentication based on using the derived second symmetric cryptographic key in challenge-response authentication comprising:

displaying at least a first character string as a challenge;

receiving at least a second character string as response to the challenge;

determining a third character string based on the derived second symmetric cryptographic key and the displayed first character string;

in response to the received second character string matching the determined third character string, determining the authentication of the user to be successful; and in response to successfully authenticating the user, granting the user access to the industrial machine of the industrial system.

12. A second apparatus associated with a backend system, the second apparatus comprising:

at least one processor;

at least one memory including computer program code; and a second storage configured to store a first symmetric cryptographic key established and shared between an industrial machine of an industrial system and a backend system when commissioning the industrial machine, the first symmetric cryptographic key being specific to the industrial system;

the at least one memory and the computer program code configured to, with the at least one processor, cause the second apparatus at least to:

obtain a user identifier uniquely associated with a user;

derive a second symmetric cryptographic key specific at least to the user based at least on the obtained user identifier and the stored first symmetric cryptographic key; and provide the user access to the derived second symmetric cryptographic key.

13. A method, comprising:

obtaining, by a second apparatus associated with a backend system, a user identifier uniquely associated with a user;

deriving, by the second apparatus, a second symmetric cryptographic key specific at least to the user based at least on the obtained user identifier and a first symmetric cryptographic key established and shared between an industrial machine of the industrial system and a backend system when commissioning the industrial machine, the first symmetric cryptographic key being specific to the industrial system and stored in a second storage in the second apparatus; and providing, by the second apparatus, the user access to the derived second symmetric cryptographic key.

14. A non-transitory computer readable medium comprising computer program instructions, which, when executed in a data processing apparatus, causes a second apparatus associated with a backend system to perform at least the following:

obtaining a user identifier uniquely associated with a user;

deriving a second symmetric cryptographic key specific at least to the user based at least on the obtained user identifier and a first symmetric cryptographic key established and shared between an industrial machine of the industrial system and a backend system when commissioning the industrial machine, the first symmetric cryptographic key being specific to the industrial system and stored in a second storage in the second apparatus; and providing the user access to the derived second symmetric cryptographic key.

* * * * *